Oct. 27, 1964  B. BACHMANN  3,153,983
HYDRAULIC ONE-EDGE COPYING DEVICE FOR MACHINE TOOLS
Filed June 21, 1961  8 Sheets-Sheet 1

INVENTOR.
Bernhard Bachmann
BY

INVENTOR.
Bernhard Bachmann

INVENTOR.
Bernhard Bachmann
BY

INVENTOR.
Bernhard Bachmann
BY

Oct. 27, 1964  B. BACHMANN  3,153,983
HYDRAULIC ONE-EDGE COPYING DEVICE FOR MACHINE TOOLS
Filed June 21, 1961  8 Sheets-Sheet 6

INVENTOR.
Bernhard Bachmann
BY

Oct. 27, 1964     B. BACHMANN     3,153,983
HYDRAULIC ONE-EDGE COPYING DEVICE FOR MACHINE TOOLS
Filed June 21, 1961     8 Sheets-Sheet 7
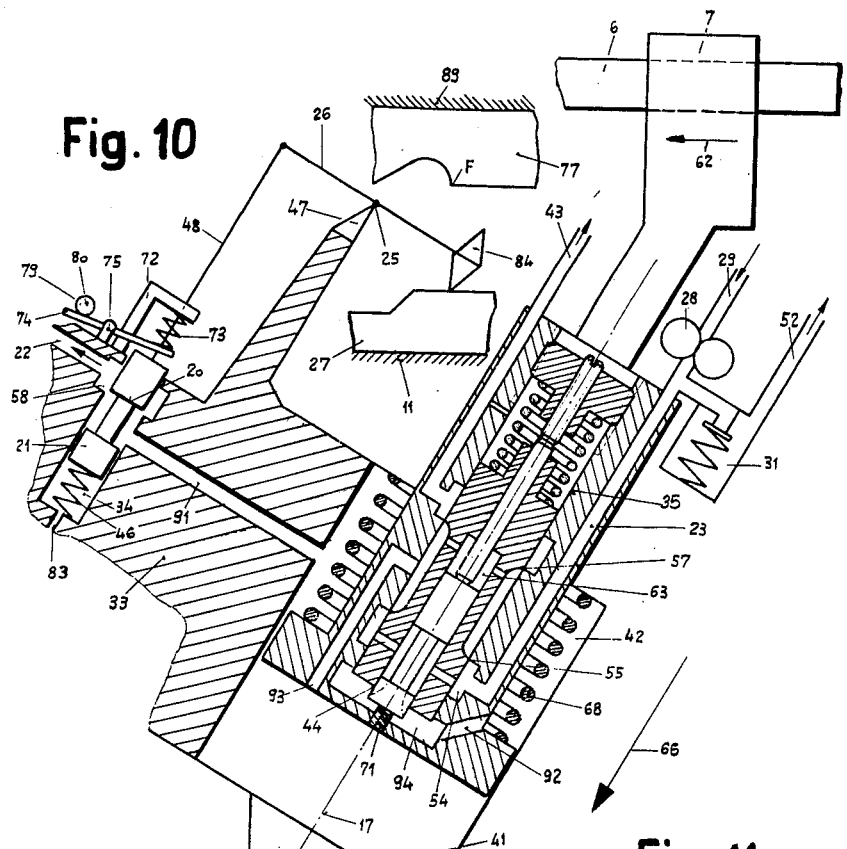
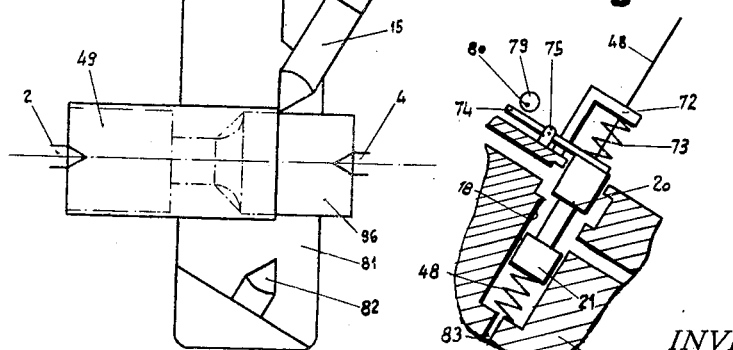
INVENTOR.
Bernhard Bachmann
BY

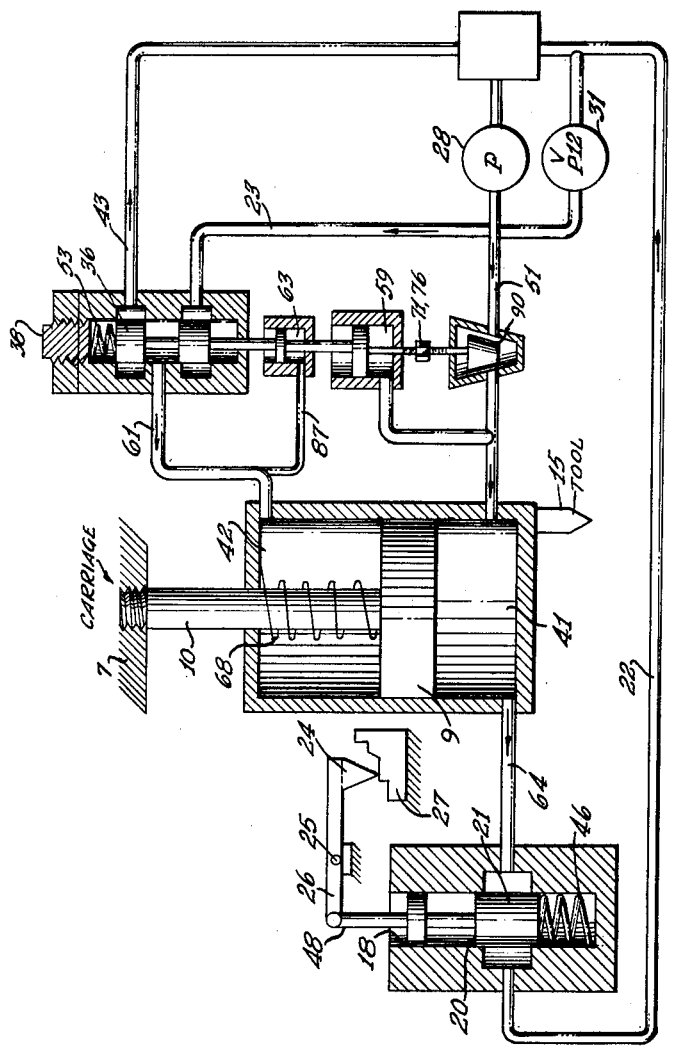

United States Patent Office 3,153,983
Patented Oct. 27, 1964

3,153,983
HYDRAULIC ONE-EDGE COPYING DEVICE
FOR MACHINE TOOLS
Bernhard Bachmann, Schaffhausen, Switzerland, assignor to Georg Fischer Aktiengesellschaft, Schaffhausen, Switzerland
Filed June 21, 1961, Ser. No. 130,443
Claims priority, application Switzerland, Feb. 3, 1961, 1,303/61
10 Claims. (Cl. 91—37)

The present invention relates to a hydraulic one-edge copying control device for machine tools, especially for copying lathes, in which the longitudinally movable carriage which carries out the lead feed has fixedly connected to each side thereof a piston adapted to be actuated, while the transverse carriage or copying carriage is equipped with a copying control slide for controlling said transverse carriage in conformity with a templet. With copying devices of the above mentioned general type, the tool carriage carrying the turning tool is generally displaced by a differential piston which is actuated by fluid pressure on opposite sides and is controlled by a feeler in conformity with a templet, a pattern or a sample work piece. The pressure fluid which flows continuously in the same direction is by controlling the pressure on both sides of the piston so controlled that the copying control slide will in conformity with its displacement throttle the discharge of the pressure fluid from one piston side while simultaneously opening the discharge of the fluid from the other piston side.

With these constructions, for instance the pressure in the annular chamber of the working cylinder might increase up to the maximum pump pressure at a counter pressure of zero in the cylinder chamber. Inversely, however, at a pressure increase in the cylinder chamber, also a pressure increase in the annular chamber will occur up to the overflow pressure determined by the adjustment of a spring element. The pump output will thus be exploited fully in one direction only with regard to the developed power.

Similar remarks apply to another construction in which at an increase in pressure in the cylinder chamber, the maximum pressure is determined by a second overflow valve in the cylinder chamber.

When copying, due to the varying cutting force in view of alternately occurring larger and smaller chip removals, inaccuracies in the copying operation will occur when advancing and retracting the copying carriage carrying the tool.

Cases are encountered in which the copying carriage is to be displaced at high speed, for instance during the finishing operation on work pieces with greatly varying diameters where it is necessary to work at high cutting speeds. However, with the same unit it must also be possible to carry out heavy and very heavy cuts to which end high working pressures of the pump are required. As a result thereof, frequently a non-permissible heating up of the pressure fluid takes place so that this type of systems cannot be considered as economical.

It is, therefore, an object of the present invention to provide a copying device in which the pressure in the first working cylinder chamber may increase to the maximum pump pressure while simultaneously the pressure in the second working cylinder chamber may drop to zero.

It is also an object of this invention to provide a copying device of the above mentioned type in which the pressure in the second working cylinder chamber may increase to the maximum pump pressure while the counter pressure in the first working cylinder chamber may be zero.

It is a further object of this invention to provide a copying device as set forth above, in which the pump output will be fully and economically exploited during the various methods of operation.

These and other objects and advantages of the invention will appear more clearly from the following specification in connection with the accompanying drawings, in which.

Figure 4:
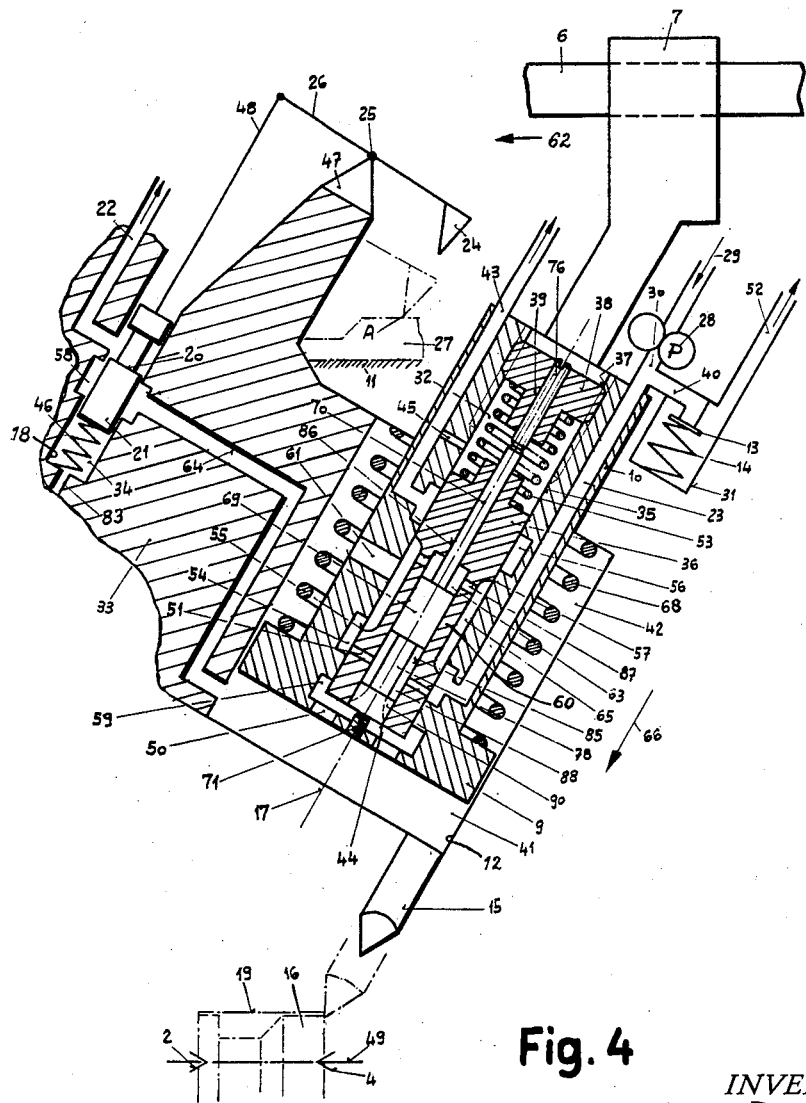
FIG. 4 is a diagrammatic section through a hydraulic copying device according to the invention showing the control elements in a position which they occupy at the start of the copying control device.
Figure 7:
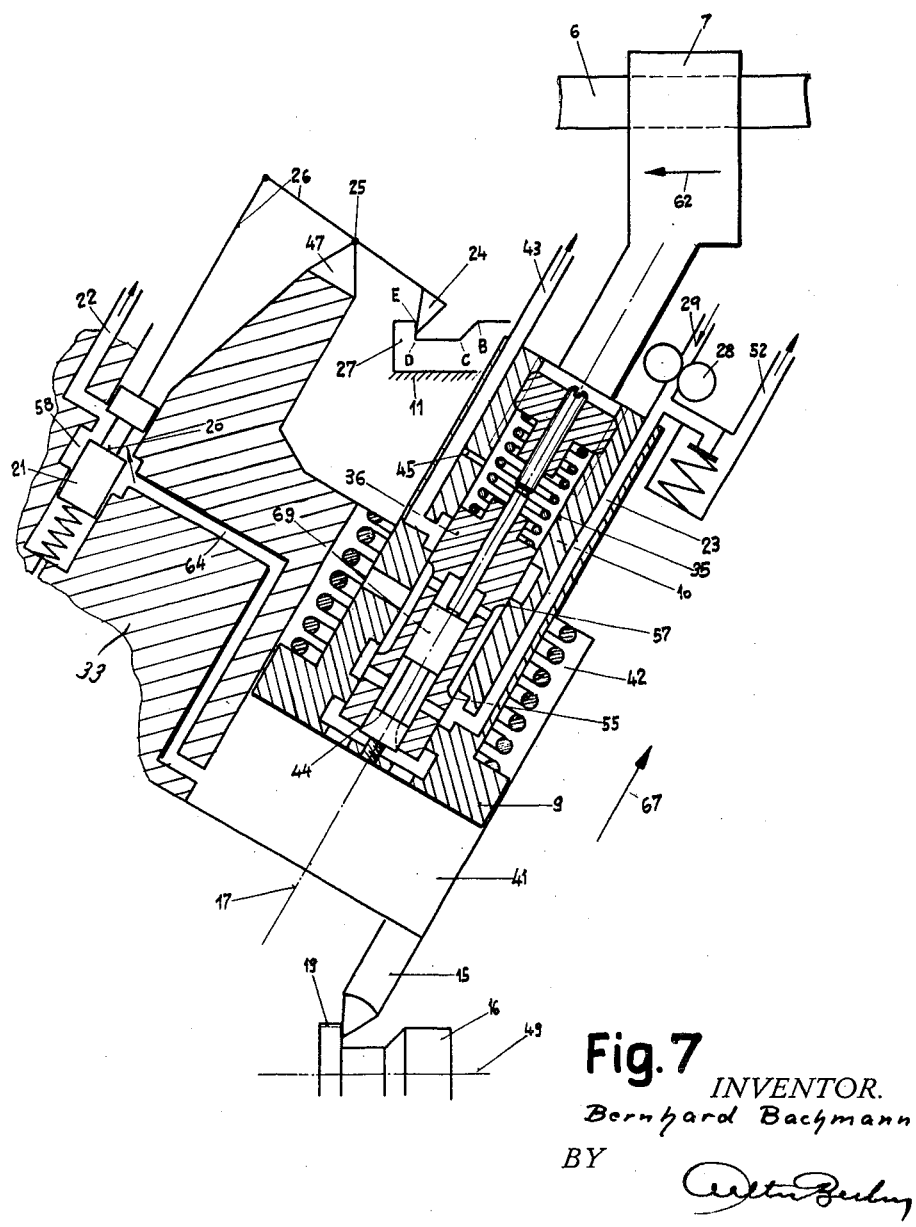

FIG. 7 likewise illustrates a section similar to that of FIG. 4 with the control elements occupying a position during outward copying.

Figure 8:
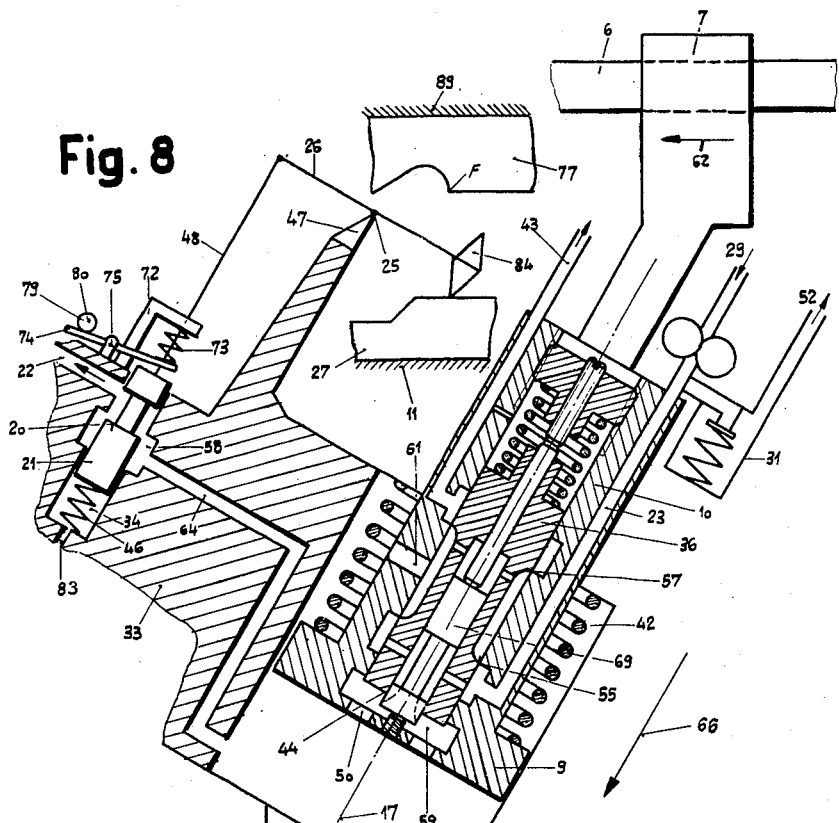

FIG. 8 is a diagrammatic section through a further embodiment of a copying control arrangement according to the invention.

Figure 9:
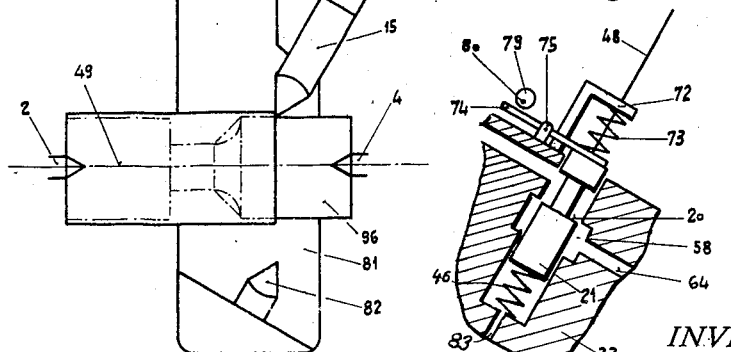

FIG. 9 shows a detail of a device for changing the copying direction.

FIG. 10 is a diagrammatic section through a third embodiment of a copying control device according to the invention.

FIG. 11 shows a detail of a device for changing the copying direction.

FIG. 12 is a schematic showing of the hydraulic circuitry and components incorporated into the hydraulic copying device of FIG. 4, like numerals designating like parts.

With heretofore known copying control devices of the type involved, it is not uncommon that, due to the relatively long feeding and discharging conduits for the pressure fluid, certain delays are encountered between the various control members. Such delays bring about a relatively slow reaction of the copying device because an impulse which acts for instance from a control slide to the throttle slide through the intervention of the working piston chamber requires a certain time of movement. The one-edge copying control device according to the present invention does not have these drawbacks and is characterized primarily in that for purposes of controlling the pressure fluid, which is furnished by a pump, in a pressure conduit leading to the copying control slide and to a working piston chamber, there is, in addition to the customary safety pressure relief valve, also provided a throttle member controlled by the pressure in the first piston chamber. Furthermore, in the pressure conduit leading to the other piston chamber, there is provided a differential control slide acted upon on one side by a spring and on the other side by the pressure in the piston chamber. The arrangement is such that said differential pressure slide will under the influence of a pressure in the first piston chamber effect communication between the second piston chamber and an open return conduit or with the pump pressure conduit, if no pressure prevails in the first working piston chamber.

Figure 1:
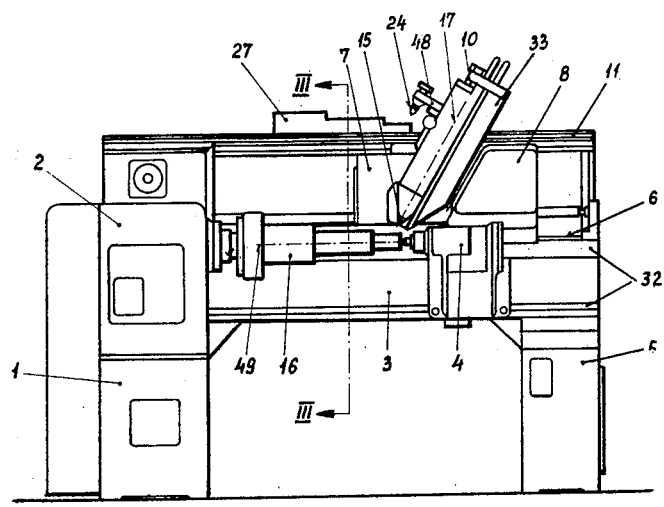
FIG. 1 is a front view of a copying lathe according to the invention.
Figure 2:
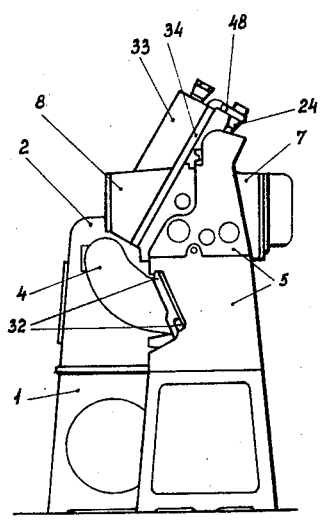
FIG. 2 shows a side view of the copying lathe of FIG. 1.
Figure 3:
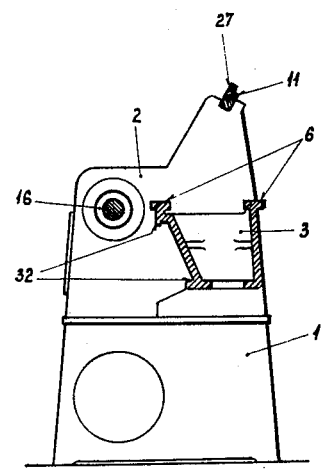
FIG. 3 is a section taken along the line III—III of FIG. 1.

Referring now to the drawings in detail, and FIGS. 1 to 3 thereof in particular, the arrangement shown therein comprises a stand 1 which carries a head stock 2, and also comprises a further stand 5. The two stands 1 and 5 support a lathe bed 3 which is provided with slide rails 32. Displaceably mounted on said slide rails 32 is a tail stock 4 so that the latter may move parallel to the work piece axis 49. The tail stock 4 is adapted to be clamped fast by any convenient means. The bed 3 is furthermore equipped with additional slide rails 6 on which is displaceably mounted a longitudinally displaceable carriage 7. This carriage has connected thereto a feed transmission box 8 and is displaceable in any convenient manner parallel to the axis of rotation 49 of the work piece 16.

The work piece 16 may be supported between the head stock 2 and the tail stock 4 in any convenient manner and may be rotated by the head stock 2. The longitudinally displaceable carriage 7 is equipped with a carriage guide 34 for a copying carriage 33 equipped with a copying turning tool 15. The copying carriage 33 has a cylindrical bore 12 in which a piston 9 is displaceably mounted. The piston 9 has a connecting rod 10 which is connected to the longitudinally displaceable carriage 7 in any convenient manner. In order at least partially to balance the weight of the copying carriage 33, the cylinder bore 12 has arranged therein a pressure spring 68 which, when the hydraulic copying system is at a standstill, holds the carriage 33 in a lifted position illustrated in FIG. 4. The feeding axis 17 of carriage 33 may, depending on the type of the copying work to be effected on the work piece 16, be arranged perpendicularly or at an acute angle with regard to the axis of rotation 49 of the work piece 16. The means for adjusting the feeding axis 17 with regard to the desired feeding angle are not illustrated inasmuch as they do not form a part of the present invention and may consist of any conventional means. In the particular showing of FIG. 4, the angle of inclination of the feeding axis 17 with regard to the axis of the work piece 49 is approximately 60°.

A support 11 has one end connected to the upper end of the stand 1 and has its other end connected to the upper end of the stand 5. This support 11 serves for receiving a copying templet 27 which is held in support 11 (FIG. 3) in any convenient manner. Instead of the copying templet 27 illustrated in FIGS. 1 to 7, or the copying templets 77 and 27 illustrated in FIG. 8, also patterns or sample work pieces may be employed. Mounted in a bore 18 of the copying carriage 33 is a copying control spool or piston 21 having a displaceable control edge 20. A pressure spring 46 pushes spool 21 upwardly (FIG. 4) when the hydraulic system is under no pressure. The bore 18 communicates with a pressure fluid reservoir not shown through a return conduit 22. This pressure fluid reservoir may for instance be arranged in the interior of the carriage 7. Bore 18 is provided with an annular groove 58 which communicates with a conduit 64. Mounted on the copying carriage 33 is a support 47 with a pivot 25 serving as pivot stud for a feeler 48 with a button 24. The feeler 48 is connected to the copying control spool 21 by means of a link 26.

A pressure fluid pump 28 adapted to be driven for instance by an electric motor, draws fluid through a suction line 29 from a fluid reservoir and conveys the same under pressure into pressure conduits 30, 40 and 23. Conduit 40 has interposed therein a safety relief valve 31 with a valve member 13, a pressure spring 14 adapted to be adjusted as to its thrust in any convenient manner, and with a return conduit 52 leading into the fluid reservoir. Valve 31 will become active when for instance during the movements of the copying carriage, piston 9 abuts one of the two ends of cylinder bore 12 or when the copying carriage 33 abuts a fixed abutment. In these instances, the pump pressure rises up to the maximum value corresponding to the adjustment of the pressure spring 14, and the pressure fluid will then escape through conduit 52.

The piston 9 or its connecting rod 10 is provided with a bore 35 having an inner thread 37. Within bore 35 there is longitudinally displaceably mounted a pressure differential slide 36 with two control edges 55 and 57 and a thinner central portion 60 forming an annular chamber 65. The inner thread 37 is engaged by a nut 38 with a threaded bore 39. This nut 38 is adjustable in thread 37 by any convenient means (not illustrated). The thread bore 39 serves for receiving an adjusting screw 76.

The slide 36 has preferably coaxially arranged therein a bore 85 for receiving a throttle spool 69. Slide 36 is furthermore provided with a bore 86 for receiving and guiding an upper slide bar 70. Above the throttle spool 69, radial bores 87 lead from the central portion 60 of slide 36 and the annular chamber 65 thereof into the central bore 85, while radial bores 61 lead from bore 35 into a piston ring chamber 42. A longitudinal bore 23 in connecting rod 10 leads from the pressure line 30 of pump 28 into an annular chamber 54 of bore 35. The pressure differential slide 36 is provided with radial bores 51 which establish communication between the annular chamber 54 and an annular chamber 88 which latter is formed by a neck portion 78 of the throttle spool 69.

The throttle slide 69 is provided with at least one V-shaped throttle section 90 the cross section of which increases toward the piston side or an annular chamber 59 which communicates with the working piston chamber 41 through bores 50. A longitudinal bore 43 in connecting rod 10 leads from an annular chamber 56 back into the fluid reservoir.

The head portion of connecting rod 10 or piston 9 is provided with an adjusting screw 71 which together with the abutment bar 70 serves the purpose of arresting the throttle slide 69 with regard to the piston 9, its connecting rod 10 and pressure differential slide 36 at the desired point. By adjusting the nut 38, it is possible to vary the thrust of a pressure spring 53 which presses the differential pressure slide 36 downwardly when the control device is under no pressure. A bore 64 in the copying carriage 33 establishes communication between the piston chamber 41 and the annular chamber 58 of the copying control valve 21.

From chamber 32 of bore 35 having pressure spring 53 mounted therein, a vent 45 leads into a longitudinal bore 43, and a venting bore 83 leads from chamber 34 of bore 18 with pressure spring 46 into the atmosphere.

The operation of the copying device shown in FIGS. 1 to 7 is as follows. It may be assumed that, as indicated in FIGS. 4, 5, 6 and 7, on the copying lathe illustrated in FIGS. 1 to 3 a work piece 16 is to be copied in conformity with the templet 27 illustrated in FIGS. 4 to 7 and that this work piece is to be made from a cylindrical blank.

It may furthermore be assumed that during the turning, the work piece 16 having the blank contour 19 is clamped to the head stock 2 by means not illustrated and is rotated by the lathe spindle. The longitudinal feed of carriage 7 on sliding or guiding rails 6 is effected in the direction of the arrow 62 by non-illustrated mechanical, hydraulical or electrical standard means.

The working piston 9 which is connected to the longitudinal carriage 7 by means of connecting rod 10 is assumed to be stationary, and during the copying operation the copying carriage 33 together with the copying feeler 24 carries out movements relative to the copying templet 27 which is likewise fixedly mounted on the support 12 of the lathe. These movements which are controlled by the control slide 21 are effected in the direction of the feeding axis 17, i.e. in the direction of the arrows 66 or 61.

FIG. 4 illustrates the copying carriage 33 and the control elements in a position which they occupy at a time when the hydraulic copying control is turned off, i.e. when the pressure fluid pump 28 is not delivering.

At the time when the hydraulic copying control is turned off, in other words, when the pressure fluid pump 28 just begins to deliver, it will be obvious that the copying carriage 33 will be held in its illustrated position in view of the thrust exerted by spring 68. Inasmuch as the copying feeler 24 nowhere makes contact, the copying control spool 21 will by spring 46 be lifted into the illustrated position where the control edge 20 closes the annular chamber 58. The control spool 69 is always held in its illustrated position by the adjusting screws 71 and 76 and rod 70, and the pressure differential slide 36 is pressed downwardly by the thrust of spring 53 in bore 35 so that control edge 55 is opened and control edge 57 is closed.

The position of the pressure differential slide 36 during the operation thereof is determined by the pressure in the annular chamber 59 and the thrust of the pressure spring 53. When the pressure differential slide 36 occupies its highest position, a certain constant pressure drop exists between the pressure fluid in conduit 51 and the pressure fluid in annular chamber 59.

Pressure fluid from pump 28 passes through conduits 30, 23 and 51 into the annular chambers 54 and 65 and through bore 87 into the chamber 63 of central bore 85. As a result thereof, the pressure differential slide 36 is lifted and the control edge 55 is closed so that pressure fluid may now pass through throttle slots 90 into annular chamber 59 and through bores 50 into piston chamber 41, conduit 64 and annular chamber 58. In view of the rising pressure in chamber 41, the copying slide 33 drops down until the copying feeler 24 abuts that portion of the copying templet 27 which is designated with the letter A in FIG. 4. It will be appreciated that pressure fluid will escape from the piston ring chamber 42 through bore 61 and annular chambers 65 and 56 into conduit 43 leading to the fluid reservoir. It will also be appreciated that the copying control spool 21 will be pressed somewhat downwardly through the intervention of the link system 48 and 26, whereby the control edge 20 opens the discharge conduit 22; as a result thereof, equilibrium will be established in the hydraulic copying system, and the control spools will occupy the position shown in FIG. 6. In this condition, the pressure ratio between piston annular chamber 42 and piston chamber 41 equals the ratio of the surfaces of piston chamber 41 and piston annular chamber 42. The two control edges 55 and 57 of the control slide 36 will at this time close the discharge of pressure fluid. Inasmuch as at this condition of equilibrium no pressure fluid is required for the movements of the copying slide 33, the pressure fluid will pass through at the control edge 20 and flow through conduit 22 back into the fluid reservoir. Pump 28 will then operate at low pressure so that no considerable heating up of the pressure fluid will occur.

Figure 6:
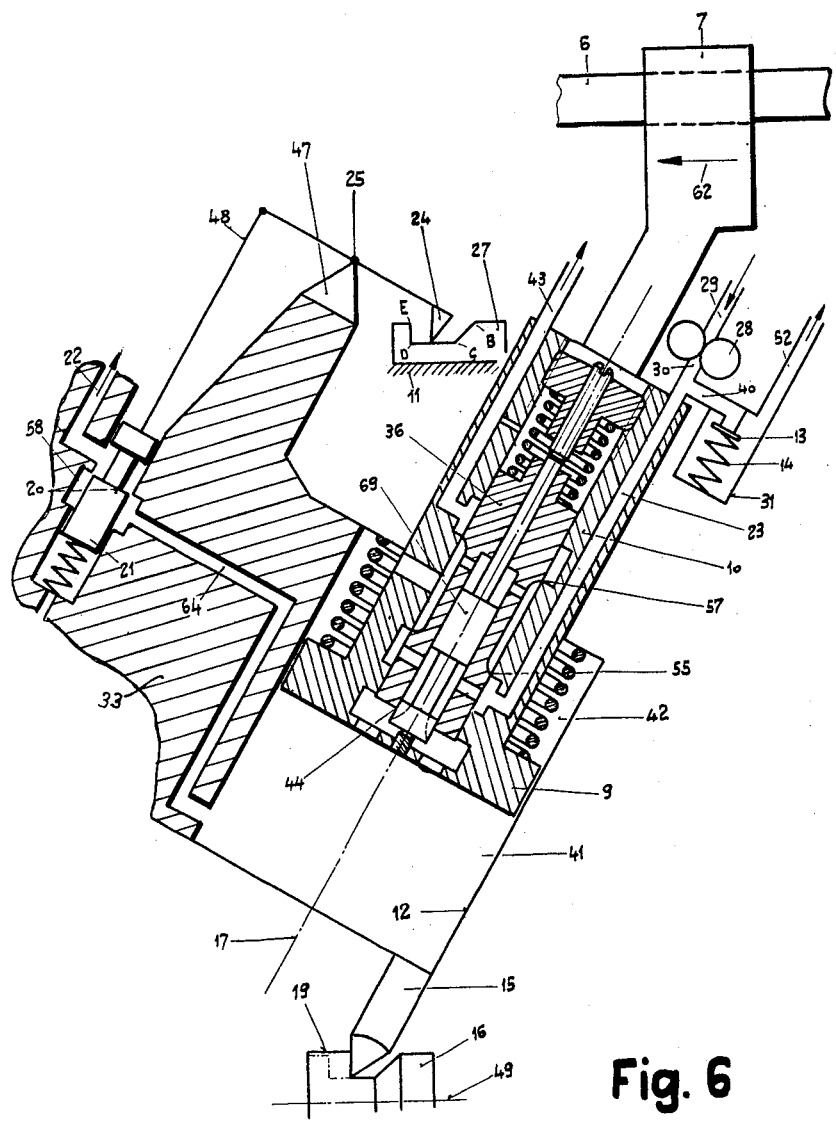
FIG. 6 is a section similar to that of FIG. 4 but showing the control elements in their position during a cylindrical turning.

If now the work piece 16 is rotated, and the feed movement of the carriage 7 is made effective so that the latter will move in the direction of the arrow 62 from the right-hand side to the left-hand side with regard to the drawing, the control members will remain in their FIG. 6 position as long as the cylindrical part A of the copying templet 27 will be copied because the copying slide 33 will retain its position unchanged with regard to the carriage 7.

Figure 5:
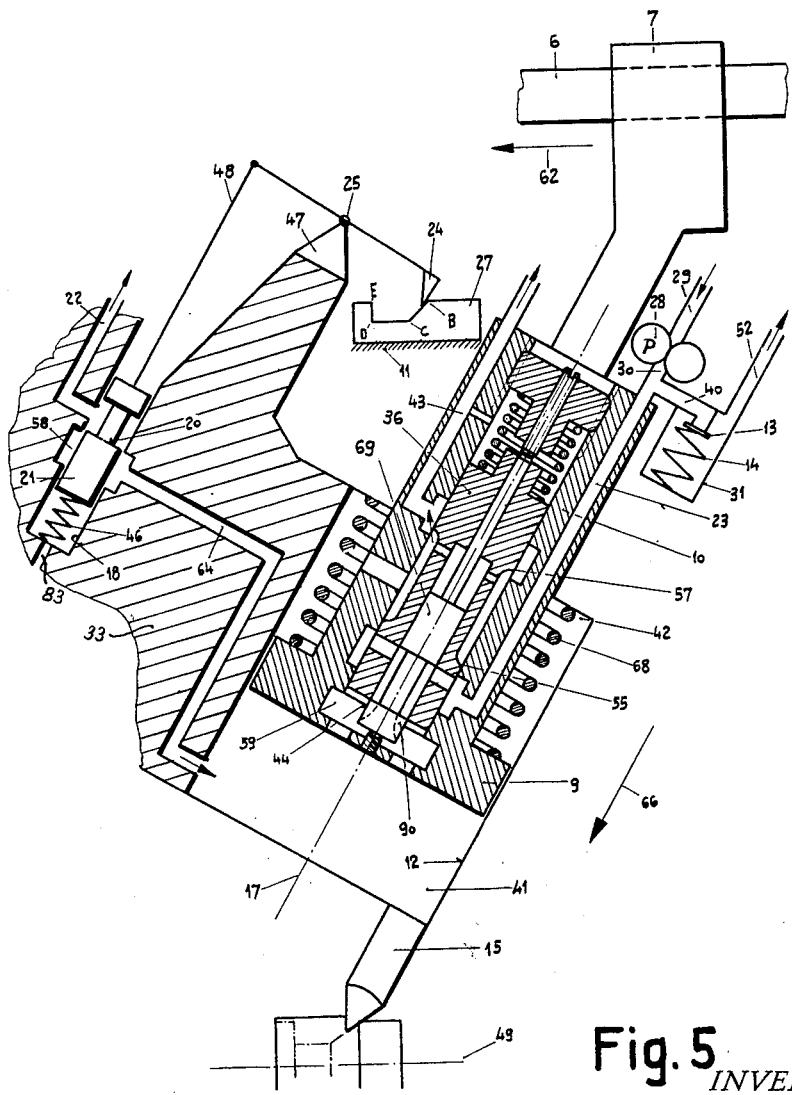
FIG. 5 is a section similar to that of FIG. 4 showing the control elements in their position when plunge-cut copying (Einstichkopieren).

When the copying feeler 24 during its further feeling of the copying templet 27 has arrived at the reversing point B, feeler 24 moves downwardly (FIG. 5) whereby the copying control spool 21 will be lifted in view of the pressure spring 46. As a result thereof, the control edge 20 moves into its closing position. Inasmuch as the pressure fluid can now no longer escape through conduit 22, the pressure in conduit 58 and in conduit 64 increases and therefore also in the piston chamber 41 and in the annular chamber 59 (FIG. 5). The copying carriage 33 will then move in the direction of the arrow 66. Due to the increase in pressure in chamber 59, the pressure differential slide 36 is lifted so that the throttling edge 44 opens up and the pressure will also increase in conduits 23 and 30. This in turn increases the pressure in pump 28.

In view of the pressure increase in annular chamber 59, the pressure differential slide 36 is further displaced upwardly whereby its lower control edge 55 moves into closing position, and control edge 57 opens up. Pressure fluid from piston ring chamber 42 now passes through conduits 61, 65, 56 and 43 into the fluid reservoir so that the pressure in the piston ring chamber 42 drops toward zero.

At best, the pressure in pump 28 and thereby in conduits 30, 23, 40, annular chamber 54 and bore 51 may rise up to the pressure adjusted by the adjustment of the safety relief valve 31, whereupon valve 31 will open and the pressure fluid will return to the fluid reservoir through the overflow conduit 52.

If during the copying operation the feeler 24 reaches the reversing point C (FIG. 5) of the copying templet 27, the copying control slide 21 moves from its FIG. 5 position downwardly. The pressure in conduits 58, 64, 41, 50 and 59 drops whereby the throttle spool 69 moves into its FIG. 6 position. Due to the pressure drop in conduit 59 also the pressure in conduits 88, 54, 23, 30 and thereby also in pump 28 drops so that the pump will be relieved. The pressure differential slide 36 is displaced downwardly by pressure spring 53, and the control members will during the copying operation of the cylindrical central portion of work piece 16 move into their FIG. 6 position in which the hydraulic copying system is equalized or at balance.

If during the further copying operation, the copying feeler 24 reaches the reversing point D of the copying templet 27, the copying feeler 24 is tilted somewhat downwardly as illustrated in FIG. 7. As a result thereof, the copying slide 21 is displaced downwardly so that the control edge 20 opens up the discharge into conduit 22. The pressure in conduits 58, 64, 41, 50 and 59 drops to zero. The pressure differential slide 36 is due to the effect of the pressure spring 53 moved downwardly and then will occupy its FIG. 4 position. In view of the strong restriction of the passage cross section at the throttle edge 44 (FIG. 7), the pressure increases at 88, 51, 54, 23, 30 and in pump 28. In view of the pressure drop at 59, the pressure differential slide 36 is somewhat displaced downwardly by pressure spring 53 so that the control edge 55 opens whereby pressure fluid will pass from conduits 30, 23, 54 to 65, 61 and into the piston annular chamber 42. The maximum force of displacement in the direction of the arrow 67 (FIG. 7) will be obtained when due to the pressure of pump 28 and in conduits 30, 40, 23, 51, 88, 65, 61 and thereby in the annular piston chamber 42 the safety relief valve 31 will open.

When the copying feeler 24 reaches the reversing point indicated by the letter E, the feeler lever 48 will be turned in clockwise direction so that the copying control slide 21 will be lifted somewhat until it has reached its FIG. 6 position. As a result thereof, a slight pressure increase will occur in conduits 58, 64, piston chamber 41 as well as in conduits 50 and 59. The pressure increase in conduit 59 brings about a displacement of the pressure differential slide 36 in upward direction into the intermediate position shown in FIG. 6, and the pressure increase in conduit 33 brings about an increase in the pressure in annular chamber 59 and thereby a slight displacement of the pressure differential slide 36 in the position shown in FIG. 6 so that the passage cross section at the throttle edge 44 will increase further. During the copying of the short cylindrical portion at the left-hand end of the copying templet 27, a state of balance will prevail in the hydraulic copying system as has been shown in FIG. 6.

After work piece 16 has been completed, the copying feeler 24 may by convenient or standard means not illustrated in the drawing be lifted off from the copying templet 27 so that tool 15 can be lifted from the work piece 16 and a new turning operation may be started.

FIGS. 8 and 9 illustrate a further embodiment of the invention according to which the same parts shown in FIGS. 1 to 7 are designated with the same numerals employed in connection with FIGS. 1 to 7. The hydraulic copying device according to FIGS. 8 and 9 is particularly intended for copying work pieces while selectively and successively first the operation is effected in conformity with an upper and thereupon with an oppositely located lower copying templet or vice versa. In this connection two oppositely located turning tools are employed as has been illustrated in FIG. 8.

The copying carriage 33 has in conformity with FIG. 9 arranged thereon a bracket 72 (illustrated on a somewhat larger scale than in the remaining figures). Against bracket 72 there rests one end of a pressure spring 73 whereas the other end thereof rests on a lever 74 freely having one end engaging the upper end of the copying control slide 21. Lever 74 is tiltably journalled in a bearing 75 mounted on the copying slide 33, and an eccentric disc 79 rotatable by any convenient means not shown in the drawings about an axis 80 serves for adjusting lever 74 to tilt the lever to its FIG. 8 position where it prevents spring 73 from acting on slide 21 or to release the lever to its FIG. 9 position where it bears on slide 21 and spring 73 prevails over spring 46. The thrust of pressure spring 73 must be in excess of that of pressure spring 46 below the copying control slide 21. In conformity with FIG. 8, a double turning tool holder 81 may be mounted on the copying slide 33. According to the diagrammatic illustration of FIG. 8, an upper turning tool 15 with for instance forwardly directed cutting edge may be mounted in the tool holder 81, while a lower turning tool 82 with rearwardly directed cutting edge is likewise supported by the tool holder 81. Both tools will become effective one after another.

Mounted on the supporting surface 11 for the copying templet is a copying templet 27 for controlling the movements of the turning tool 15. Above said templet 27 and spaced therefrom there is provided a copying templet 77 which controls the movements of the lower turning tool 82, said templet 77 being mounted on an upper supporting surface 89 of the lathe, which supporting surface 89 is not shown in FIGS. 1 to 3 but is indicated in FIG. 8.

The copying feeler 84 arranged on the copying feeler lever 48 differs from that of FIGS. 4 to 7 in that it permits successively to feel the upper and the lower copying templet 77 and 27 respectively or vice versa.

Instead of the double turning tool holder 81 shown in FIG. 8, it would also be possible likewise to employ an inner copying turning tool holder with two tools for the inner copying. Furthermore, the cutting edges of the two turning tools 15 and 82 shown in FIG. 8 may be directed to the same side while when reversing the copying device from one tool to the other tool, the direction of rotation of the machine tool spindle would have to be changed.

The operation of the device shown in FIGS. 8 and 9 is as follows. When feeling the lower copying templet 27 while the longitudinal carriage 7 is displaced in the direction of the arrow 62, the eccentric disc 79 will occupy its FIG. 8 position in which the left-hand side end of lever 74 presses downwardly so that the right-hand end of lever 74 which rests on copying control slide 21 will compress the pressure spring 73, i.e. will make the latter ineffective. The operation thus corresponds to that described in connection with FIGS. 4 to 7.

If it is now intended, for instance on work piece 96, to copy by means of the lower turning tool 82 a contour corresponding to the upper copying templet 77 or at least a portion thereof, while the longitudinal carriage 7 is displaced counter to the direction of the arrow 62, it will be necessary by any convenient means to turn the eccentric disc 79 about its axis 80 into the position shown in FIG. 9. In this way, the right-hand end of the lever 74 and thereby also the pressure spring 73 may rest upon the upper end of the copying control slide 21 so that the latter will be pressed downwardly whereby the control edge 20 will open and pressure fluid will escape from the piston chamber 41 through conduits 64, 58, 20 and 22. As a result thereof, the copying carriage 33 rises until the copying feeler 84 hits the upper copying templet 77 whereupon equilibrium will be established in the hydraulic control system as has been described in connection with the cylindrical copying according to FIG. 6.

When the copying feeler 84 in a non-illustrated manner reaches the point F of the upper copying templet 77, the pressure spring 73, the thrust of which exceeds that of the pressure spring 46 acting upon the control slide 21, will press the control slide 21 downwardly whereby the control edge 20 will open. Pressure fluid will then escape from conduits 58, 64, 41, 50 and 59 through conduit 22 so that the copying carriage 33 will rise. Due to the pressure drop in conduit 59, the pressure differential slide 36 will be displaced downwardly by pressure spring 53 so that the control edge 44 closes. This means that the pressure in chamber 41 drops further. In view of the displacement of the pressure differential slide 36, control edge 55 will be opened, and the control edge 57 will be closed so that all of the pressure fluid will pass through conduits 23, 54, 65 and 61 into the piston annular chamber 42 as has been described in connection with FIG. 4. The further operation will be evident from the description of FIGS. 5 to 7.

Referring now to FIGS. 10 and 11 illustrating a further embodiment of the present invention, it will be noted that in contrast to the arrangement of FIGS. 4 to 9 in which the pressure in chamber 41 controls the pressure in chamber 42, the pressure in the piston chamber 41 will be controlled by the pressure prevailing in the piston annular chamber 42.

Those parts which are identical in both embodiments have been designated with the same reference numerals. The arrangement of FIGS. 10 and 11 differs from that of FIGS. 4 to 9 primarily in that the pressure conduit connected to the pressure fluid pump 28 leads into the annular chamber 54. Furthermore, a bore 93 leads from the annular chamber 65 in the interior of piston rod 10 or piston 9 into the piston chamber 41. Radial bores 92 lead from chamber 94 of bore 35 to the annular chamber 42, and a bore 91 leads from the piston chamber 42 into the annular chamber 58 at the copying control slide 21 the control edge 20 of which is with this embodiment located on the bottom side. This embodiment could, however, also be designed without the additional device to the change in the copying direction, i.e. it could be similar to that shown in FIGS. 4 to 7. In this instance, only the lower copying templet 27 could be felt because the pressure spring 46 has the tendency to displace the copying control slide 21 in opening direction of the control edge 20.

The operation of the copying device shown in FIG. 10 is as follows, when the reversing parts 79, 74, 73 occupy their illustrated positions, i.e. when the pressure spring 73 has been made ineffective.

In pressure-less condition the copying slide 33 is lifted into its highest position by pressure spring 68. When employing two oppositely located copying templets 27 and 77 as has been illustrated in FIGS. 8 and 9, and also in FIGS. 10 and 11, shifting means of any desired type may be provided which, when the hydraulic control system is in its pressure-less condition, will prevent the copying slide 33 which is lifted by pressure spring 68 from being raised to such an extent that the copying feeler 84 engages the upper copying templet 77, inasmuch as this would damage the latter. The copying control slide 21 will be moved upwardly by pressure spring 46 so that the control edge 20 will be opened.

By means of the thrust of spring 53 the pressure differential slide 36 will be moved downwardly relative to the stationary throttle slide 69 so that the control edge 44 will be closed. The control edge 55 is open and conduit 57 is closed.

When starting the pressure fluid pump 28, pressure fluid passes through conduits 30, 23, 54, 55, 65, 93 into the piston chamber 41 whereby the copying slide 33 is lowered. Inasmuch as control edge 20 is open, pressure fluid may escape from annular chamber 42 through conduits 91 and 58 into conduit 22. Simultaneously, pressure fluid passes from annular chamber 65 through radial bores 87 into chamber 63 whereby the pressure differential slide 36 will be moved upwardly relative to the stationary throttle slide 69 in piston 10 and against the thrust of pressure spring 53 so that the control gap 44 will be opened somewhat. In view of the lowering of the copying slide 33, the copying feeler 84 moves to the copying templet 27 while through the intervention of the feeler lever 26 and rod 48 the copying control slide 21 will be displaced downwardly against the thrust of pressure spring 46 so that the control gap of control edge 20 will be reduced. In a maner described above, equilibrium will be established in the hydraulic copying control system inasmuch as the elements 10, 36 and 69 will occupy the position shown in FIG. 6.

The copying of the contour according to templet 27 is effected by the turning tool 15 in the manner described above.

If, however, following the copying of the work piece 96 in conformity with templet 27 for instance a portion of the already prepared contour is to be copied by the lower turning tool 82 in conformity with the upper copying templet 77, it will be necessary by any convenient means to turn the eccentric disc 79 about its axis 80 into the position shown in FIG. 11. As a result thereof, in pressure-less condition of the hydraulic copying control, the copying control slide 21 will be pressed downwardly whereby control edge 20 will close.

If the copying feeler 84 during the lifting of the copying slide 33 moves on to the copying templet 77, the copying control slide 21 will be displaced upwardly until equilibrium has been established in the hydraulic copying system. If the longitudinal slide 7 is displaced in the direction of the arrow 62, it will be evident that when point F of the templet 77 has been reached, the copying feeler lever 26 first turns about point 25 in counterclockwise direction whereby the control edge 20 will close copying control slide 21 somewhat. Consequently, the pressure in chamber 42 rises, and copying slide 33 moves upwardly. The further copying will be effected in the manner described above.

The change pressure control system with control throttle according to the present invention has over a constant pressure system the following advantages:

There are available greater forces in both copying directions because the pressure on one side of the working cylinder may be selected as high as desired until pressure fluid flows off through the safety check valve. The counter presure in the working cylinder is at its minimum zero.

The pump requires less power and is relieved to a great extent for instance when finishing. With increasing force, the pump power increases. The pump output thus adapts itself to the chip work. The heating of the pressure fluid is less. The hydraulic system operates more economically.

The copying precision is higher because the pressure in one piston chamber controls the pressure in the other piston chamber. This means that at the same power difference the copying control slide carries out a shorter movement than is the case with a hydraulic control system with constant pressure (differential pressure control).

By the arrangement according to the invention of the throttle slide in the piston rod proper, the reaction ability of the copying is greatly improved because long pipe lines between the individual control elements will be avoided.

It is, of course, to be understood that the present invention is, by no means, limited to the particular constructions shown in the drawings but also comprises any modifications within the scope of the appended claims.

What I claim is:

1. In a hydraulically operable templet controlled copying device, a double acting fluid motor comprising a piston and cylinder, said fluid motor having a first side responsive to fluid pressure for moving the piston and cylinder relatively in one direction and a second side responsive to fluid pressure for moving the piston and cylinder relatively in the other direction, a source of pressure fluid, means forming a restrictor connecting said source of pressure fluid with said first side of said fluid motor, a control valve connecting said first side of said fluid motor with exhaust, said control valve being biased toward closed position, a templet follower connected with the control valve adapted for engaging a templet for adjusting the control valve against said bias for variably exhausting said one side of said fluid motor, a slide valve in said piston and conected to the said second side of said fluid motor and also to said source of pressure fluid and to exhaust, and moveable in one direction in said piston to connect said second side of said fluid motor to exhaust and moveable in the other direction in said piston to connect said second side of said fluid motor with said source of pressure fluid, said slide valve being resiliently biased in one of said directions and having a fluid operable means pertaining thereto for urging it in the other of said directions, said fluid operable means being hydraulically connected with said first side of said fluid motor, said means forming a resistor comprising a member connected to said piston, said member also being located in said slide valve, said slide valve and member having means cooperating to restrict fluid flow through the restrictor, the restriction to fluid flow offered by said means forming a restrictor being variable in response to movements of said slide valve in said piston.

2. In a hydraulically operable templet controlled copying device, a double acting fluid motor comprising a piston and cylinder, said fluid motor having a first side responsive to fluid pressure for moving the piston and cylinder relatively in one direction and a second side responsive to fluid pressure for moving the piston and cylinder relatively in the other direction, a source of pressure fluid, a passage connecting said source with said first side of said fluid motor, a restrictor member in said passage and moveable therein to vary the degree of restriction offered thereby to fluid flow in the passage, a control valve connecting said first side of said fluid motor with exhaust, said control valve being biased toward closed position, a templet follower connected with the control valve adapted for engaging a templet for adjusting the control valve against said bias for variably exhausting said one side of said fluid motor, a slide valve in said piston and connected to the said second side of said fluid motor and also to said source of pressure fluid and to exhaust and moveable in one direction in said piston to connect said second side of said fluid motor to exhaust and moveable in the other direction in said piston to connect said second side of said fluid motor with said source of pressure fluid, said slide valve being resiliently biased in said other direction and having a fluid operable area pertaining thereto for urging it in said one direction, said fluid operable area being hydraulically connected with the said first side of said fluid motor, said restrictor member being telescopically mounted with said slide valve and being connected to said piston, said passage extending through said slide valve whereby said degree of restriction offered by said member is variable in response to movement, of said slide valve in said piston.

3. In a hydraulically operable templet controlled copying device, a double acting fluid motor comprising a piston and cylinder, said fluid motor having a first side responsive to fluid pressure for moving said piston and cylinder relatively in one direction and a second side responsive to fluid pressure for moving the piston and cylinder relatively in the other direction, a source of pressure fluid, a restrictor connecting said source of pressure fluid with said first side of said fluid motor, a control valve connecting said first side of said fluid motor with exhaust, said control valve being biased toward closed position, a templet follower connected with the control valve adapted for engaging a templet for adjusting the control valve against said bias for variably exhausting said one side of said fluid motor, a slide valve in said piston and connected to the said second side of said fluid motor and also to said source of pressure fluid and to exhaust and moveable in one direction in said piston to connect said second side of said fluid motor to exhaust and moveable in the other direction in said piston to connect said second side of said fluid motor with said source of pressure fluid, said slide valve being resiliently biased in said other direction and having a fluid operable area pertaining thereto for urging it in said one direction, said fluid operable area being hydraulically connected with the said first side of said fluid motor, said slide valve having a bore therein, said restrictor being mounted in said bore and being connected with said piston for adjustment relative to said slide valve when the slide valve moves in the piston and being arranged so as to increase its restrictive effect when the slide valve moves in said other direction and to decrease its restrictive effect as said slide valve moves in said one direction.

4. A hydraulically operable templet controlled copying device according to claim 1 in which said fluid operable means comprises a first fluid operable area hydraulically connected with the said first side of said fluid motor and a second fluid operable area hydraulically connected with the said second side of said fluid motor.

5. In a hydraulically operable templet controlled copying device, a double acting fluid motor comprising a piston and a cylinder, said fluid motor having a first side responsive to fluid pressure for moving the piston and cylinder relatively in one direction and a second side responsive to fluid pressure for moving the piston and cylinder relatively in the other direction, a source of pressure fluid, a passage connecting said source with said first side of said fluid motor, a restrictor member in said passage and moveable therein for varying the degree of restriction to fluid flow offered by said member, a control valve connecting said first side of said fluid motor with exhaust, said control valve being biased toward closed position, a templet follower connected with the control valve adapted for engaging a templet on said templet support for adjusting the control valve against said bias for variably exhausting said one side of said fluid motor, a slide valve in said piston and connected to the said second side of said fluid motor and also to said source of pressure fluid and to exhaust and moveable in the piston in one direction to connect said second side of said fluid motor to exhaust and moveable in said piston in the other direction to connect said second side of said fluid motor with said source of pressure fluid, said slide valve being resiliently biased in said other direction and having a fluid operable area pertaining thereto for urging it in said one direction, said fluid operable area being hydraulically connected with the said first side of said fluid motor, said passage extending through said slide valve, said restrictor member telescopically engaging said slide valve, said member being connected to said piston and having tapered groove means therein cooperating with shoulder means on the slide valve for effecting the said connection of the source of pressure fluid with said first side of said fluid motor whereby movement of said slide valve in said piston will vary the degree of restriction to fluid flow offered by said member.

6. In a hydraulically operable templet controlled copying device for a machine tool such as a lathe, a double acting fluid motor, said fluid motor having a first side and a second side, a source of pressure fluid, a passage connecting said source with said first side of said fluid motor, a restrictor member in said passage and moveable therein for varying the degree of restriction to fluid flow offered by said member, a control valve connecting said first side of said fluid motor with exhaust, said control valve being biased toward closed position, a templet follower connected with the control valve adapted for engaging a templet for adjusting the control valve against said bias for variably exhausting said one side of said fluid motor, a slide valve in said piston and connected to the said second side of said fluid motor and also to said source of pressure fluid and to exhaust and moveable in one direction to connect said second side of said fluid motor to exhaust and moveable in the other direction to connect said second side of said fluid motor with said source of pressure fluid, said slide valve being resiliently biased in one of said directions and having a fluid operable means pertaining thereto for urging it in the other of said directions, said fluid operable means being hydraulically connected with at least one side of said fluid motor, said fluid motor comprising a cylinder and a piston therein, said piston being hollow, said slide valve being reciprocally mounted in the piston and said restrictor member being adjustably connected to said piston whereby movement of the slide valve and piston relatively will vary the degree of restriction to fluid flow offered by said restrictor member.

7. In a hydraulically operable templet controlled copying device for a machine tool such as a lathe, a double acting fluid motor connected to said fluid motor having a first side and a second side, a source of pressure fluid, a passage connecting said source with said first side of said fluid motor, a restrictor member in said passage and moveable therein for varying the degree of restriction to fluid flow offered by said member, a control valve connecting said first side of said fluid motor with exhaust, said control valve being biased toward closed position, a templet follower connected with the control valve adapted for engaging a templet for adjusting the control valve against said bias for variably exhausting said one side of said fluid motor, a slide valve in said piston connected to the said second side of said fluid motor and also to said source of pressure fluid and to exhaust and moveable in one direction to connect said second side of said fluid motor to exhaust and movebale in the other direction to connect said second side of said fluid motor with said source of pressure fluid, said slide valve being resiliently biased in said other direction and having a fluid operable area pertaining thereto for urging it in said one direction, said fluid operable area being hydraulically connected with the said first side of said fluid motor said restrictor comprising a member telescopically engaging said slide valve and having tapered groove means therein cooperating with said slide valve for effecting the said connection of the source of pressure fluid with said first side of said fluid motor, and movement of said slide valve in said piston in its said other direction being operable for restricting said groove means, said fluid motor comprising a cylinder and a piston therein, said piston being hollow, said slide valve being reciprocally mounted in the piston, and the said member being stationarily but adjustably connected to said piston.

8. In a fluid operable templet controlled copying device; a double acting fluid motor having a first side responsive to fluid pressure to actuate the motor in one direction and a second side responsive to fluid pressure to actuate the motor in the other direction, a source of fluid under pressure, a slide valve in the motor reversibly connecting said second side of said fluid motor with said source and with exhaust, variable restrictor means in the slide vlave connecting said source with said first side of said fluid motor, valve connected between the said first side of said fluid motor and exhaust moveable in accordance with a controlling templet to entrap fluid in said first side of said fluid motor or to variable exhaust the same, resilient means biasing said slide valve in one direction, fluid operable means pertaining to the slide valve for urging it in the other direction and hydraulically connected to at least one side of said motor, and means for varying said restrictor means in response to movement of said slide valve for adjustment of the restrictor means in accordance with movements of the slide valve.

9. A copying device according to claim 8 which includes spring means urging said motor in said other direction.

10. A copying device according to claim 9 in which said template controlled valve has oppositely acting spring means associated therewith adapted for being made selectively effective for biasing said template controlled valve in respectively opposite directions.

References Cited in the file of this patent

UNITED STATES PATENTS

| | | |
|---|---|---|
| 2,602,437 | Tancred | July 8, 1952 |
| 2,618,833 | Adams | Nov. 25, 1952 |
| 2,686,650 | Evans | Aug. 17, 1954 |
| 2,849,206 | Waterson | Aug. 26, 1958 |

FOREIGN PATENTS

| | | |
|---|---|---|
| 1,001,080 | Germany | Jan. 17, 1957 |
| 761,979 | Great Britain | Nov. 21, 1956 |